March 4, 1924.
H. E. LAKE
FRUIT CORER
Filed Dec. 28, 1922
1,485,681
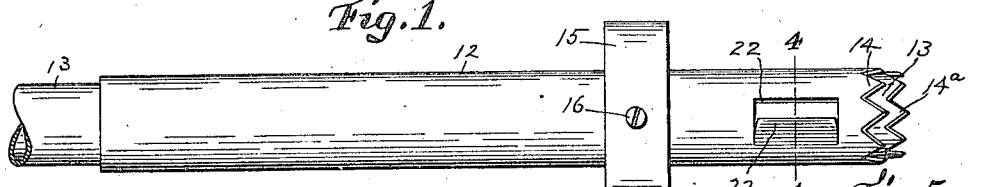
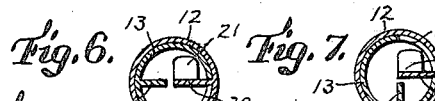
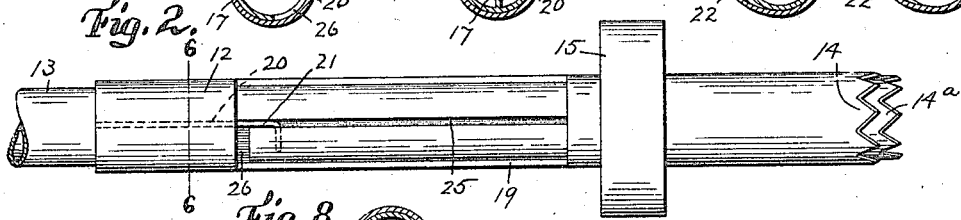
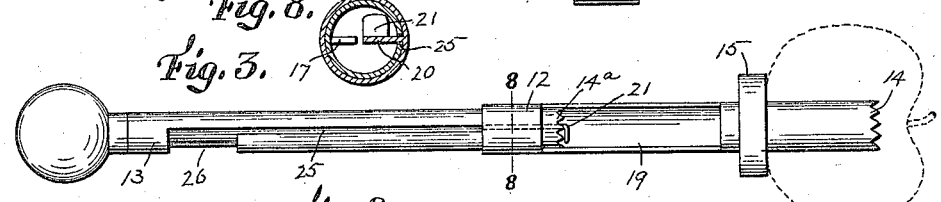
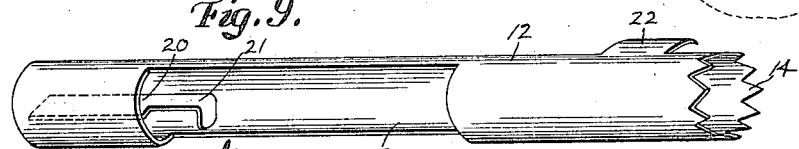
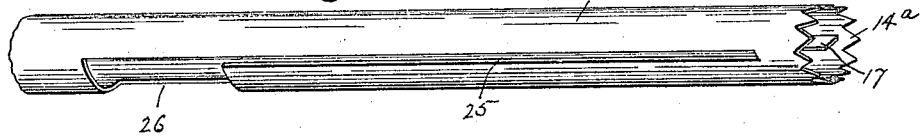
Inventor
Harry E. Lake
Attys.

Patented Mar. 4, 1924.

1,485,681

UNITED STATES PATENT OFFICE.

HARRY E. LAKE, OF READING, MASSACHUSETTS.

FRUIT CORER.

Application filed December 28, 1922. Serial No. 609,395.

*To all whom it may concern:*

Be it known that I, HARRY E. LAKE, a citizen of the United States, residing at Reading, in the county of Middlesex and State of Massachusetts, have invented new and useful Improvements in Fruit Corers, of which the following is a specification.

This invention has for its chief object to provide a corer for apples and other fruits, adapted to be conveniently and accurately operated to remove the core, in such manner as to form a cavity in the fruit which is open at one end, the other end being closed, so that the fruit becomes a cup adapted to confine sugar, etc., while the fruit is being cooked.

Another object is to provide a corer having a reaming cutter which is fixed to the corer and is insertible therewith into a fruit, and is operable after the removal of the core, to remove seeds and seed cells, and permit the ejection of the same from the corer.

I attain the above-mentioned and other objects by the improved construction hereinafter described and claimed.

Of the accompanying drawings forming a part of this specification,—

Figure 1 is a side view of a corer including an outer and an inner tube, the inner tube being projected into the outer tube.

Figure 2 is a view similar to Figure 1, looking toward the opposite side.

Figure 3 is a view on a reduced scale, similar to Figure 2, the inner tube being retracted.

Figure 4 is a section on line 4—4 of Figure 1.

Figure 5 is a view similar to Figure 4, the inner tube being omitted.

Figure 6 is a section on line 6—6 of Figure 2.

Figure 7 is a view similar to Figure 6, showing the inner tube partly turned to actuate the core-twisting ear hereinafter described.

Figure 8 is a section on line 8—8 of Figure 3.

Figures 9 and 10 are perspective views of the outer and inner tubes.

The same reference characters indicate the same parts in all the figures.

In carrying out my invention, I provide a corer comprising a tubular cutter, adapted to form an annular kerf in an apple, and partially detach the core thereof, leaving one end connected with the body of the apple, and means for twisting the partially detached core and thereby completing its detachment, so that the core is removable, to leave in the apple a cavity which is closed at one end.

The corer may be provided with stop means, limiting the insertion of the cutter into an apple, to prevent liability of extending the kerf entirely through the apple. The corer is provided with a substantially tangential reaming cutter, overhanging an opening in the tubular cutter, and insertible with the latter into an apple, the reaming cutter being operable by rotation of the tubular cutter, to remove seeds and seed cells remaining in the apple after the removal of the core, and force the removed matter into the tubular cutter.

A corer characterized as above stated is preferably constructed as next described. The tubular cutter is formed by a pair of telescoping tubes 12 and 13, the inner tube 13 being adapted to move endwise and turn in the outer tube 12. Each tube has an annular cutting outer end, here shown as formed by serrating and sharpening the tube end to form teeth 14 on the outer tube, and teeth 14ª on the inner tube. It is obvious, however, that these cutting ends may be otherwise formed.

I provide means as hereinafter described, for limiting the endwise and turning movements of the inner tube 13, the arrangement being such that when the inner tube is projected, as shown by Figures 1 and 2, its cutting end is in close proximity to the cutting end of the outer tube, so that the tubes are adapted to form an annular kerf in an apple. The depth of said kerf may be limited by a stop 15, secured to the outer tube 12, at a suitable distance from the cutting end. Said stop may be a collar releasably secured by a set screw 16, or otherwise, to the outer tube, and adjustable thereon. In case the operator is sufficiently expert, the stop 15 may be omitted.

The inner tube 13 is provided with a core-twisting ear 17 (Figures 4 and 10), adapted to force its way into the core, and operable by a turning movement of the inner tube to twist the partially detached core sufficiently to complete its detachment. Said ear is also operable by an endwise movement of the inner tube to the retracted position shown by Figure 3, to withdraw the detached core to position to drop out through a lateral outlet opening 19, in the outer tube. Said opening is formed between the ends of the tube, and the inner end of the tube is provided with an inwardly projecting ear 20, on which is formed an extension 21, constituting an ejector projecting into the opening 19, and adapted to arrest the core when it reaches a position enabling it to drop out through said opening.

The outer tube 12 is provided, adjacent to its cutting end, with a reaming cutter 22, which is preferably integral with the tube, and is substantially tangential to the periphery thereof, as shown by Figures 4 and 5. The reaming cutter, which is adapted to be forced into the apple with the tubes, overhangs a lateral opening 23, in the outer tube, and is adapted, when the tube is turned in an apple, to cut away seeds and seed cells remaining after the removal of the core, and force the same into the outer tube. This operation is performed when the inner tube is retracted, and the portion of the outer tube having the reaming cutter, is vacant, as shown by Figure 5. The matter thus forced into the outer tube is ejected therefrom by the projection of the inner tube to the position shown by Figures 1 and 2, the core-twisting ear 17 encountering the matter in the outer tube, and forcing it out through the cutting end.

The inner tube 13 is provided with a longitudinal slot 25, extending from the outer end portion of the tube nearly to the inner end portion, as shown by Figure 10. Said slot opens into a circumferential opening 26, near the inner end of the inner tube.

When the inner tube is projected, as shown by Figure 2, the ear 20 coincides with the opening 26, and permits an independent turning of the inner tube from the position shown by Figure 6, to that shown by Figure 7, the inner tube being thus caused to actuate the core-twisting ear 17.

When the inner tube is retracted, the ear 20, which I call a guide ear, engages the slot 25, as shown by Figure 8, so that when the inner tube is turned, the outer tube turns in unison with it, the reaming cutter 22 being thus actuated.

The guide ear 20 cooperates with one end of the slot 25, and the opposite end of the opening 26, in limiting the endwise movements of the inner tube, and with the opposite longitudinal edges of the opening 26, in limiting the turning movements.

*Operation.*

The inner tube being projected, the tubes are forced together into one end of an apple, until a kerf of the desired depth is formed. While the inner tube is projected, the inner tube is turned to actuate the core-twisting ear 17. The inner tube is then retracted and withdraws the detached core from the apple and from the portion of the outer tube remaining therein, the core being ejected through the outlet opening 19, as already described. While the inner tube is retracted, the two tubes are rotated in unison, and actuate the reaming cutter 22. The outer tube is then withdrawn from the apple, and the inner tube is projected, its ear 17 being thus caused to remove the matter forced by the reaming cutter into the outer tube.

It is obvious that the annular kerf may be extended entirely through the apple, if desired, the stop 15 being omitted, and any suitable means employed to eject the core from the cutter, before the reaming operation.

I claim:

1. A fruit corer comprising a pair of telescoping tubes, adapted to form an annular kerf extending partly through a fruit, and partially detaching the core thereof, the inner tube being adapted to turn and move endwise in the outer tube, and provided with means actuated by a turning movement of the inner tube to complete the detachment of the core, and by an endwise movement of the inner tube, to withdraw the detached core, so that the fruit may be provided with a cavity open at one end only, the other end being left intact, stop means being provided for limiting the endwise and turning movements of the inner tube.

2. A fruit corer substantially as specified by claim 1, the said outer tube being provided with a substantially tangential reaming cutter, overhanging an opening in the tube, and adapted to remove matter including the seeds and seed cells, and force the same through said opening into the outer tube when the inner tube is retracted, the inner tube being adapted, when projected, to eject said matter from the outer tube.

3. A fruit corer comprising an outer tube having an annular cutting outer end, a substantially tangential reaming cutter adjacent to its cutting end, and overhanging a lateral opening in the tube, a lateral outlet between its ends, and an inwardly projecting guide ear at its inner end, provided with ejecting means projecting into said opening; and an inner tube adapted to move lengthwise and turn in the outer tube, said inner tube having an annular cutting outer end, an internal core-twisting ear adjacent to its cutting end, a longitudinal slot, and a circumferential opening communicating with the inner end of the slot, the said circumferential opening receiving the guide ear when the inner tube is projected, so that the inner tube may be turned independently to actuate the core-twisting ear, the said slot receiving the guide ear when the inner tube is retracted, so that the tubes are connected to turn in unison and actuate the reaming cutter.

In testimony whereof I have affixed my signature.

HARRY E. LAKE.